(12) United States Patent
Major et al.

(10) Patent No.: US 8,272,432 B2
(45) Date of Patent: Sep. 25, 2012

(54) HVAC THERMAL STORAGE FOR HYBRID VEHICLE

(75) Inventors: Gregory A. Major, Farmington Hills, MI (US); Mark D. Nemesh, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1336 days.

(21) Appl. No.: 11/946,276

(22) Filed: Nov. 28, 2007

(65) Prior Publication Data

US 2009/0133415 A1    May 28, 2009

(51) Int. Cl.
*F25B 29/00* (2006.01)
*B60H 1/00* (2006.01)
*B60H 3/00* (2006.01)

(52) U.S. Cl. ............ 165/202; 165/10; 165/236; 165/42; 165/43; 165/902; 62/201; 62/244; 62/430; 62/434; 62/435; 237/2 A; 237/12.3 B

(58) Field of Classification Search .................. 165/202, 165/10, 236, 902; 62/434, 435, 201, 430, 62/244; 237/2 A, 12.3 B
See application file for complete search history.

(56) References Cited

U.S. PATENT DOCUMENTS

| | | | | |
|---|---|---|---|---|
| 4,761,967 A | * | 8/1988 | Sumikawa et al. | 165/202 |
| 5,277,038 A | * | 1/1994 | Carr | 62/434 |
| 5,553,662 A | * | 9/1996 | Longardner et al. | 165/202 |
| 6,032,869 A | * | 3/2000 | Ito et al. | 237/12.3 B |
| 6,769,623 B2 | * | 8/2004 | Ban et al. | 237/12.3 B |

FOREIGN PATENT DOCUMENTS

| | | |
|---|---|---|
| JP | 61150818 A | 9/1986 |
| JP | 02120120 A | 8/1990 |

* cited by examiner

*Primary Examiner* — John Ford

(57) ABSTRACT

A system and method for providing cool air to a passenger compartment of a hybrid vehicle in an engine off mode is disclosed. This may include operating a HVAC system to provide cold refrigerant flowing through an evaporator while an engine is operating, and forcing air through the evaporator to cool the air. A first portion of the cooled air from the evaporator is directed through a heater core and a second portion around the heater core, and an electric water pump is activated to pump coolant from a thermal storage tank, through the heater core and back to the thermal storage tank to cool the coolant. When the engine operation is ceased, the air flow is directed through the heater core, and the coolant is pumped from the thermal storage tank, through the heater core and back to the thermal storage tank to cool the air.

4 Claims, 3 Drawing Sheets

HVAC THERMAL STORAGE FOR HYBRID VEHICLE

BACKGROUND OF INVENTION

The present invention relates generally to heating, ventilation and air conditioning (HVAC) systems for hybrid vehicles, and more particularly to thermal storage for HVAC systems in hybrid vehicles.

Some hybrid vehicles do not have the capability to provide air conditioning comfort when the engine is off. To improve the overall fuel economy of the vehicles, however, it is generally preferable to have the engine off as often as possible. Nonetheless, not having continuous air conditioning capability may be unsatisfactory to vehicle occupants as compared to conventional vehicles where the engine runs all of the time—allowing for air conditioning whenever desired.

In order to address this concern, some have proposed systems for hybrid vehicles that provide air conditioning even when the engine is off. For example, some hybrid vehicles include refrigerant compressors that have their own electric motor to drive them so they can be driven independently of the engine. Others not only have a separate motor to drive the refrigerant compressor, but also incorporate a dual drive mechanism where the compressor can also be driven directly off of the accessory drive belt. However, both of these solutions add to the weight and cost of the vehicle due to the addition of the extra compressor motor as well as the electronics and cables to operate the motor. Still others have attempted to alleviate this concern by providing refrigerant thermal storage systems or secondary loop coolant system that allow for air conditioning comfort during engine off vehicle operation. But these systems still add significant cost to the air conditioning system, and some only provide the air conditioning comfort for limited amounts of time before the engine must be restarted. Moreover, the secondary loop systems have additional thermal mass that must be cooled. They also may incur intermediate heat exchanger losses or require separate fluid fill systems (e.g., coolant fill, refrigerant fill or other type of fluid).

SUMMARY OF INVENTION

An embodiment contemplates a heating, ventilating and air conditioning system for a hybrid vehicle having an internal combustion engine. The HVAC system may comprise an HVAC module including an evaporator, a heater core downstream of the evaporator, and a blend door configured to selectively block or allow air flow from the evaporator to flow through the heater core. An electric water pump has an outlet in fluid communication with a coolant inlet to the heater core, and a thermal storage tank is configured to retain coolant therein. A coolant line is connected between a coolant outlet from the heater core, and the thermal storage tank and a coolant inlet to the engine. An electronically controlled valve has a first portion configured to be in fluid communication with a heater core outlet from the engine, a second portion in fluid communication with an outlet from the thermal storage tank, and a third portion in fluid communication with an inlet to the electric water pump, with the electronically controlled valve being configured to selectively allow coolant from the first portion through the third portion and from the second portion through the third portion.

An embodiment contemplates a method of providing cool air to a passenger compartment of a hybrid vehicle in an engine off mode, the method comprising the steps of: operating a refrigerant portion of a HVAC system to provide cold refrigerant flowing through an evaporator while an engine is operating; forcing air through the evaporator to thereby cool the air; directing a first portion of the cooled air from the evaporator through a heater core and a second portion of the cooled air from the evaporator around the heater core; activating an electric water pump to pump coolant from a thermal storage tank, through a valve, the electric water pump, the heater core, and back to the thermal storage tank to thereby cool the coolant as the coolant flows through the heater core; ceasing the engine operation and the refrigerant portion of the HVAC system; after ceasing engine operation, directing substantially all of the air flow from the evaporator through the heater core; and pumping the coolant from the thermal storage tank, through the valve, the electric water pump, the heater core, and back to the thermal storage tank to thereby cool the air flowing through the heater core.

An embodiment contemplates a method of providing thermal storage to provide for cooling of a passenger compartment of a hybrid vehicle, the method comprising the steps of: operating a refrigerant portion of a HVAC system to provide cold refrigerant flowing through an evaporator while an engine is operating; forcing air through the evaporator to thereby cool the air; directing the cooled air from the evaporator around a heater core during a passenger compartment cool down event; detecting when a predetermined temperature is achieved that signals an end to the cool down event; after ending the cool down event, directing a first portion of the cooled air from the evaporator through the heater core and a second portion of the cooled air from the evaporator around the heater core; and after ending the cool down event, activating an electric water pump to pump coolant from a thermal storage tank, through a valve, the electric water pump, the heater core, and back to the thermal storage tank to thereby cool the coolant as the coolant flows through the heater core.

An advantage of an embodiment is to store thermal energy to heat and cool a passenger cabin when operating with the engine off in a hybrid vehicle, while minimizing the costs to do so. This is accomplished while providing the same pull down performance as a traditional HVAC system. Moreover, a conventional HVAC module may be employed, if so desired.

An advantage of an embodiment is that no separate fill or evacuation system is required in an assembly plant since the coolant and refrigerant can be filled the same as with a conventional vehicle.

An advantage of an embodiment is that the HVAC system may have an ability to dehumidify cabin air in heater or defrost mode.

DETAILED DESCRIPTION

Figure 1:
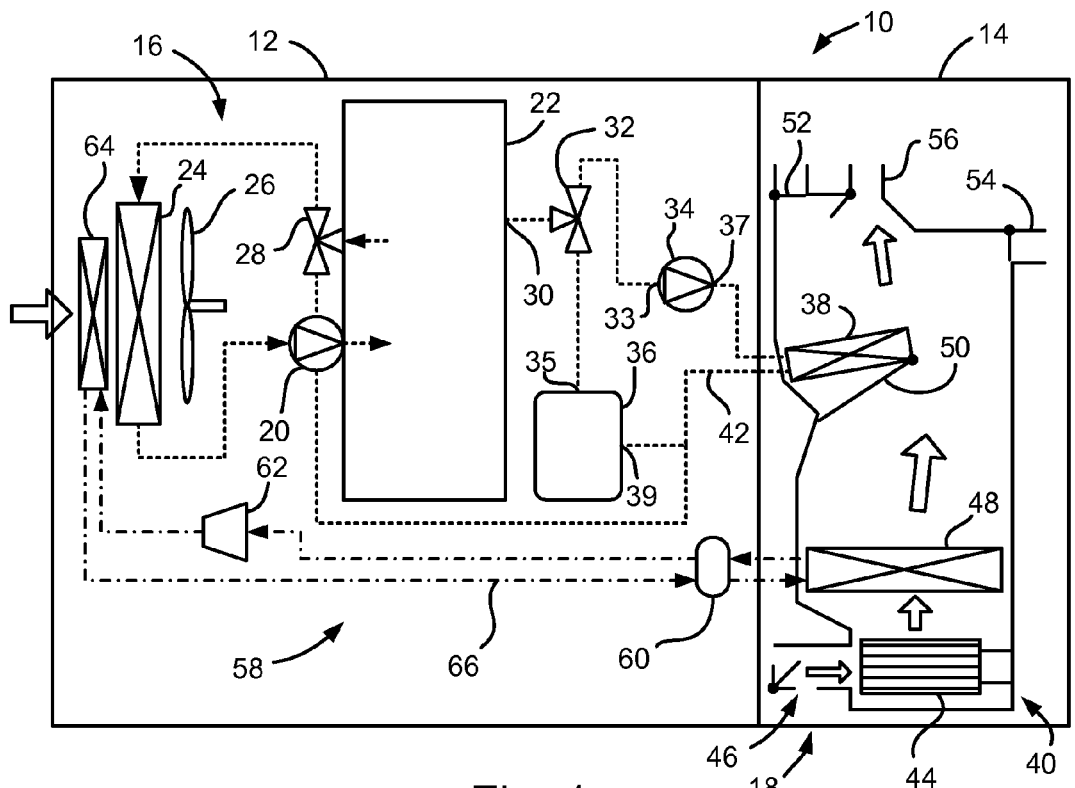
FIG. 1 is a schematic view of a hybrid vehicle, illustrating a first mode of operation.

Referring to FIGS. 1-4, a portion of a hybrid vehicle, indicated generally at 10, is shown. Since the components are the same for FIGS. 1-4, and only the mode of operation illustrated is different, the element numbers are the same. The differences between the modes of operation will be discussed below relative to the operation of the vehicle 10. The hybrid vehicle 10 includes an engine compartment 12 and a passenger compartment 14. Within the compartments 12, 14 are an engine cooling system 16 and a heating, ventilation and air conditioning (HVAC) system 18.

The engine cooling system 16 includes a water pump 20 that pushes water through an engine 22 and other portions of the engine cooling system 16. This water pump 20 may be driven by the engine 22. A radiator 24 and fan 26 are employed in a conventional fashion for removing heat from the engine coolant. A thermostat 28 is employed in a conventional fashion for selectively blocking the flow of coolant through the radiator 24 when the coolant is below a desired operating temperature.

A heater core outlet 30 from the engine 22 directs coolant to an electronically controlled valve 32. The valve 32 is also connected to an inlet 33 of an electric water pump 34 and an outlet 35 of a thermal storage tank 36. The thermal storage tank 36 is insulated in order to maintain the temperature of the coolant in the tank 36. An outlet 37 of the electric water pump 34 directs fluid into a heater core 38, located in a HVAC module 40. A line 42 directs coolant from the heater core 38 to an inlet 39 to the thermal storage tank 36 and to an inlet to the water pump 20. The dashed lines shown in FIGS. 1-5 represent coolant lines through which engine coolant flows.

The HVAC system 18 includes the HVAC module 40, within which it is located a blower 44 for drawing air in through an air inlet 46 and directing it through an evaporator 48. Downstream of the evaporator 48 is the heater core 38, which has a blend door 50 located on its upstream side that selectively directs air around or through the heater core 38. The HVAC module 40 may also include a defrost outlet and door 52, a floor outlet and door 54, and a chest height outlet and door 56, which direct air into different portions of the passenger compartment 14.

A refrigerant portion 58 of the HVAC system 18 may include the evaporator 48, a thermal expansion valve 60, a refrigerant compressor 62, and a condenser 64 connected together in a conventional fashion via refrigerant lines 66. The compressor 62 may be driven by the engine 22 in a conventional fashion, thus saving the cost of a separate electric motor to drive the compressor 62. The dash-dot lines shown in FIGS. 1-5 represent refrigerant lines through which refrigerant flows.

Filling the refrigerant portion 58 with refrigerant and the engine cooling system 16 with coolant may be accomplished in a conventional fashion. As one will note from the operating modes discussed below, the additional flexibility in operating modes is accomplished with no special fluid or separate fill required.

FIG. 1 illustrates a first mode of operation. In this mode, the engine 22 is operating and the engine cooling system 16 is operating to maintain the engine 22 at a desired temperature. Also, the refrigerant portion 58 of the HVAC system 18 is operating to provide cool air to the passenger compartment 14 during an initial cool down. During this initial cool down, the blend door 50 blocks airflow through the heater core 38, thus causing air drawn in through the air inlet 46 by the blower 44 to be directed through the evaporator 48, bypass the heater core 38, and flow out through the chest height outlet 56 to the passenger compartment 14. The large arrows in FIGS. 1-4 represent the flow of air. The smaller arrows on the refrigerant and coolant lines in FIGS. 1-4 represent the flow of refrigerant and coolant, respectively, through the particular lines.

In this first mode, then, the thermal storage tank 36 is not adding to any stored thermal energy therein. This mode will generally continue until the cool down is achieved—that is, until a desired cabin air temperature or outlet discharged temperature is reached. Since no thermal energy is being added to the thermal storage tank 36 during this mode of operation, there is no lengthening of the cool down time of the passenger compartment 14 and no loss of efficiency versus a conventional air-conditioning system.

Figure 2:
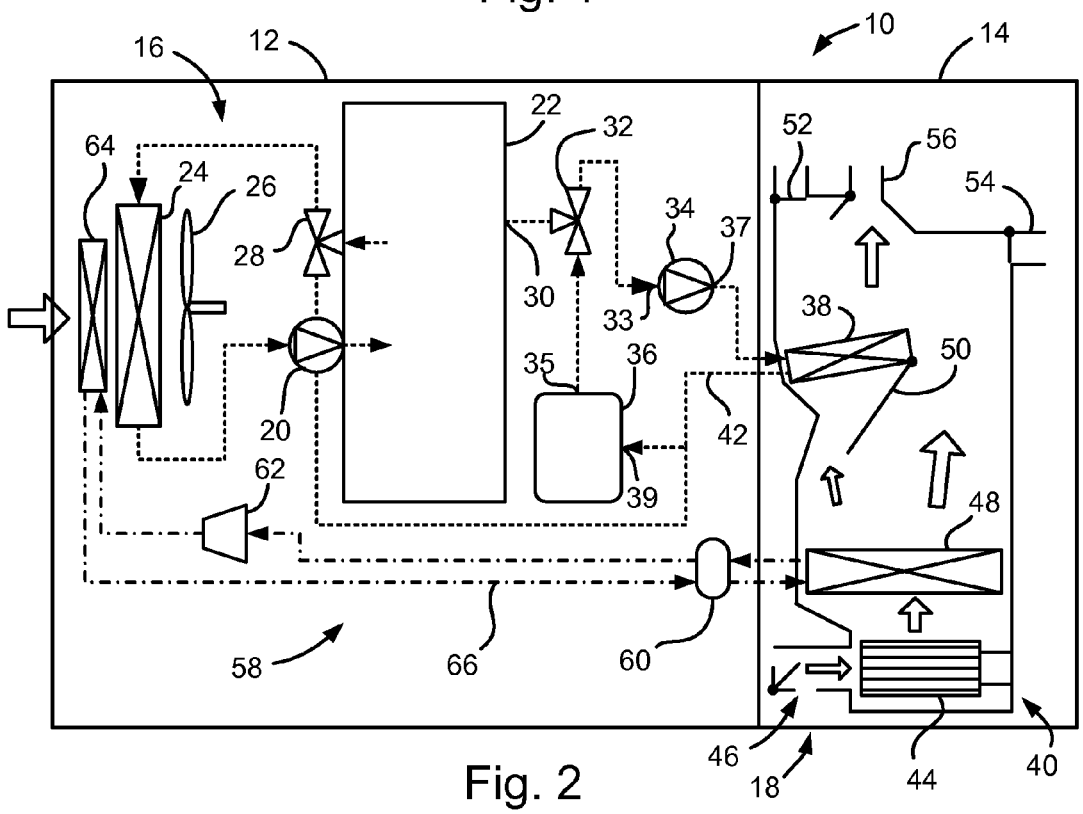
FIG. 2 is schematic view similar to FIG. 1, but illustrating a second mode of operation.

FIG. 2 illustrates a second mode of operation. In this mode, the engine 22 is operating and the engine cooling system 16 is operating to maintain the engine 22 at a desired temperature. Also, the refrigerant portion 58 of the HVAC system 18 is operating to provide cool air to the passenger compartment 14 to maintain the cabin air temperature. The blend door 50 is partially opened to allow some airflow through the heater core 38 and some airflow around the heater core 38. In addition, the valve 32 is set to allow coolant flow from the thermal storage tank 36 to the electric water pump 34, but block coolant flow from the engine 22. The electric water pump 34 is activated to pump the coolant through the heater core 38 and back to the thermal storage tank 36. With the blend door 50 partially opened, the coolant flowing through the heater core 38 will be cooled by the air flow from the evaporator 48. Accordingly, the thermal storage tank 36 will store thermal energy (i.e., cold coolant in the tank).

Figure 3:
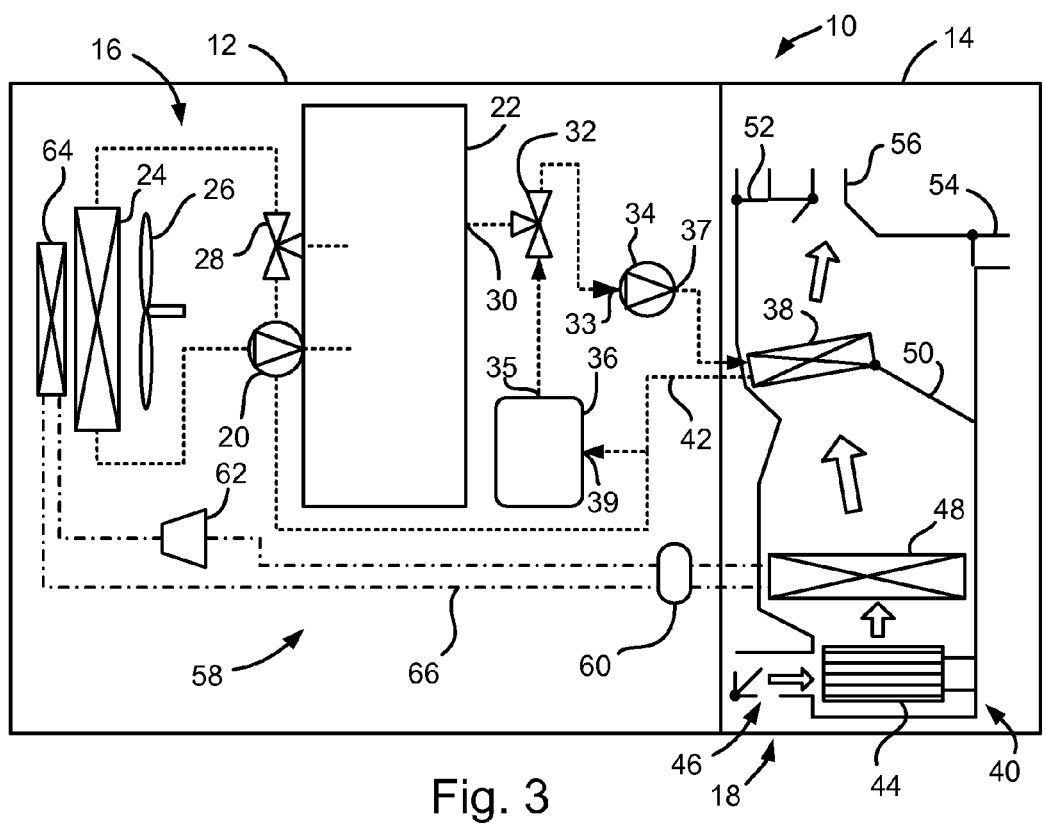
FIG. 3 is a schematic view similar to FIG. 1, but illustrating a third mode of operation.

FIG. 3 illustrates a third mode of operation. In this mode, the vehicle is operating while the engine 22 is stopped. An occupant request for air conditioning is active even though the engine cooling system 16 and the refrigerant portion 58 of the HVAC system 18 have ceased operation. In this mode, the valve 32 is set to allow coolant flow from the thermal storage tank 36 to the electric water pump 34, but block coolant flow from the engine 22. The electric water pump 34 is activated to pump the coolant through the heater core 38 and back to the thermal storage tank 36. Also, the blend door 50 is fully opened, so the air flowing through the heater core 38 will be cooled by the coolant flowing through the heater core 38. Accordingly, the stored thermal energy (i.e., cold coolant) in the thermal storage tank 36 will cool and dehumidify the air, allowing for air conditioning even when the engine 22 is off.

Figure 4:
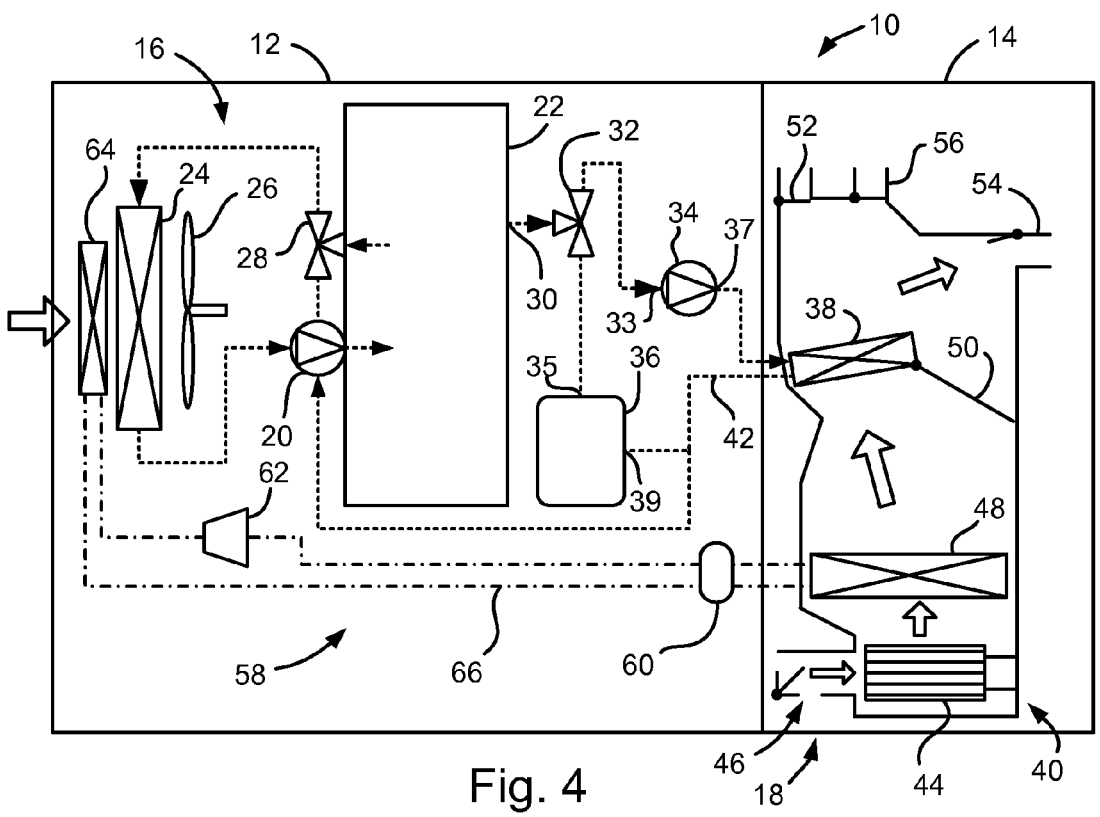
FIG. 4 is a schematic view similar to FIG. 1, but illustrating a fourth mode of operation.

FIG. 4 illustrates a fourth mode of operation. In this mode, heat is requested for the passenger compartment 14 while the engine is running. The refrigerant portion 58 is deactivated. The valve 32 is set to direct fluid from the engine heater core outlet 30, through the electric water pump 34 and heater core 38 and back to the water pump 20. Thus, even with the additional components and modes of operation, the HVAC system 18 can still operate in a conventional heating mode.

While four modes of operation have been illustrated, other modes of operation may be employed as well. For example, the thermal storage tank 36 may also be employed to store heat (i.e., hot coolant), if so desired.

Figure 5:
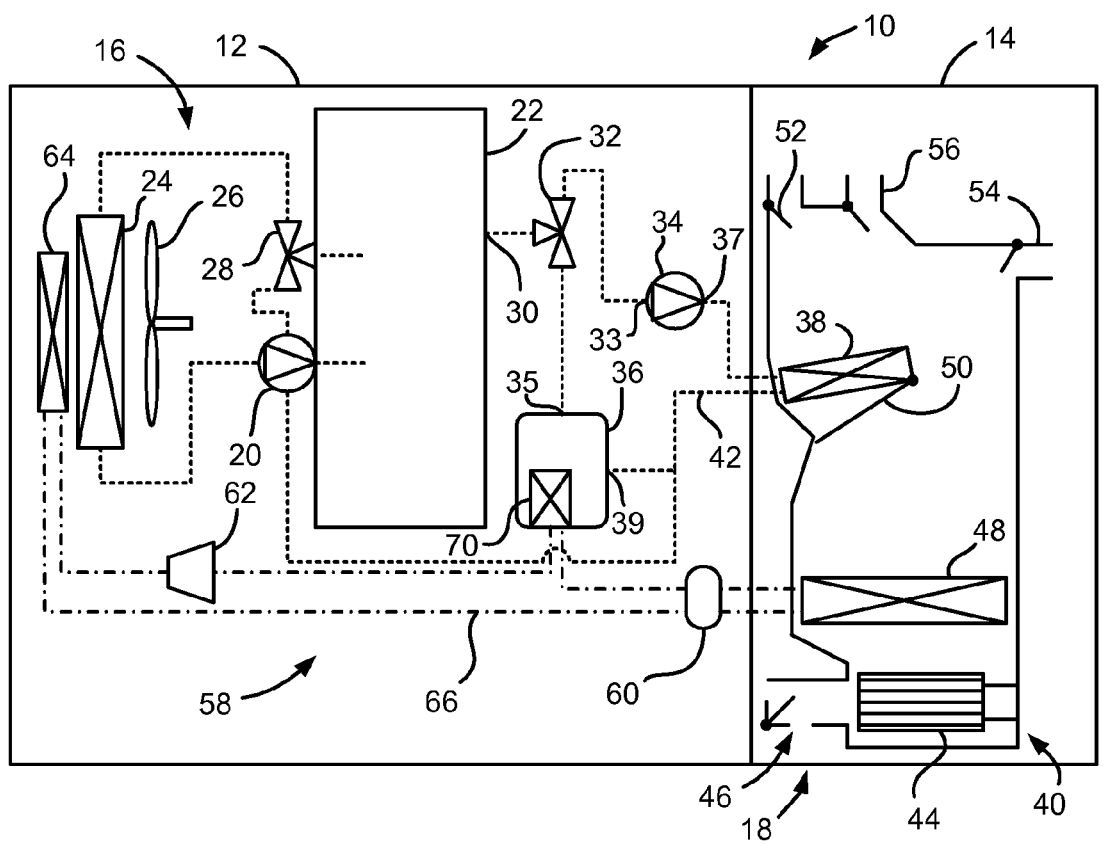
FIG. 5 is a schematic view of a hybrid vehicle according to a second embodiment.

FIG. 5 illustrates a second embodiment. Since this embodiment is similar to the first, and to avoid unnecessary repetition of the description, the same element numbers have used for elements that are similar to those in the first embodiment. In this embodiment, the engine cooling system 16 and the HVAC module 40 are the same as in the first embodiment. However, the refrigerant portion 58 of the HVAC system 18 and thermal storage tank 36 have changed. A refrigerant-to-coolant heat exchanger 70 is mounted in the thermal storage tank 36, and the refrigerant lines 66 direct refrigerant from the evaporator 48 and thermal expansion valve 60 through the refrigerant-to-coolant heat exchanger 70 before directing it to the refrigerant compressor 62. While the system of this embodiment adds the cost of the heat exchanger 70, it also allows for a reduced time to store thermal energy (i.e., cold coolant) in the thermal storage tank 36.

While certain embodiments of the present invention have been described in detail, those familiar with the art to which this invention relates will recognize various alternative designs and embodiments for practicing the invention as defined by the following claims.

What is claimed is:

1. A heating, ventilating and air conditioning system for a hybrid vehicle having an internal combustion engine comprising:

an HVAC module including an evaporator, a heater core downstream of the evaporator, and a blend door configured to selectively block or allow air flow from the evaporator to flow through the heater core, the heater core having a coolant inlet and a coolant outlet;

an electric water pump having an outlet in fluid communication with a coolant inlet to the heater core, the electric water pump having an inlet;

a cold thermal storage tank configured to retain a coolant therein and having a coolant inlet and a coolant outlet;

a coolant line connected between the coolant outlet from the heater core, and the inlet to the cold thermal storage tank and a coolant inlet to the engine;

an electronically controlled valve having a first coolant inlet portion configured to be in fluid communication with and receive the coolant from the heater core outlet from the engine, a second coolant inlet portion configured to be in fluid communication with and receive the coolant from the outlet from the cold thermal storage tank, and a third coolant outlet portion configured to be in fluid communication with and direct the coolant toward the inlet to the electric water pump, the electronically controlled valve being configured to selectively allow the coolant to flow from the first coolant inlet portion through the third coolant outlet portion and from the second coolant inlet portion through the third coolant outlet portion; and a refrigerant-to-liquid heat exchanger located in the cold thermal storage tank, the refrigerant-to-liquid heat exchanger located downstream from the evaporator and upstream from the refrigerant compressor in a direction of refrigerant flow and having a refrigerant outlet connected in direct fluid communication to a refrigerant inlet to a refrigerant compressor.

2. The heating, ventilating and air conditioning system of claim 1 wherein the electronically controlled valve is a three-way valve.

3. The heating, ventilating and air conditioning system of claim 1 wherein the cold thermal storage tank is insulated in order to maintain a temperature of the coolant in the thermal storage tank.

4. The heating, ventilating and air conditioning system of claim 1 including a refrigerant compressor configured to be driven by the engine.

* * * * *